United States Patent [19]

McGregor et al.

[11] Patent Number: 4,495,394

[45] Date of Patent: Jan. 22, 1985

[54] ELECTRONIC DEPTH CONTROLLER FOR EDM APPARATUS

[75] Inventors: John R. McGregor; Gary F. Rupert, both of Ann Arbor; Thomas M. Kennedy, Chelsea, all of Mich.

[73] Assignee: Raycon Corporation, Ann Arbor, Mich.

[21] Appl. No.: 617,149

[22] Filed: Jun. 5, 1984

Related U.S. Application Data

[63] Continuation of Ser. No. 346,689, Feb. 8, 1982, abandoned.

[51] Int. Cl.³ .............................................. B23P 1/02
[52] U.S. Cl. ............................. 219/69 C; 219/69 G; 219/69 R
[58] Field of Search ............. 219/69 G, 69 M, 69 C, 219/69 R

[56] References Cited

U.S. PATENT DOCUMENTS 3,562,476  2/1971  Rupert ........................ 219/69 G
4,071,729  1/1978  Bell, Jr. ...................... 219/69 G
4,188,522  2/1980  Baker .......................... 219/69 M
4,345,131  8/1982  Semon et al. ................. 219/69 G

FOREIGN PATENT DOCUMENTS

2041574  9/1980  United Kingdom .

Primary Examiner—Clifford C. Shaw
Assistant Examiner—Alfred S. Keve
Attorney, Agent, or Firm—Stephenson and Boller

[57] ABSTRACT

An electronic depth controller is associated with EDM apparatus for controlling the depth of holes which are machined in workpieces by the EDM apparatus. The electronic depth controller comprises its own microprocessor which acts upon selectable input data from a control panel to provide signals relating to hole depth control to the main control system of the EDM apparatus. The electronic depth controller is selectively operable to one or the other or both of two operating modes. Data relating to each mode is input to the system via switches on the control panel.

18 Claims, 3 Drawing Figures

ELECTRONIC DEPTH CONTROLLER FOR EDM APPARATUS

This application is a continuation of Ser. No. 346,689, filed Feb. 8, 1982, now abandoned.

BACKGROUND AND SUMMARY OF THE INVENTION

This invention relates generally to EDM (Electrical Discharge Machining) apparatus and is specifically concerned with a new and improved electronic depth control for such apparatus.

EDM has been successfully applied to machining of precision holes in objects. The advantages of EDM are well-known in this respect and will not be repeated here. Suffice it to say that EDM can achieve precision results where other procedures and apparatus would be totally incapable of even approximating the performance of EDM. In spite of the manifold advantages of EDM, there are particular products where extreme precision in machining holes is required. An example of one such situation is the machining of multiple blind holes in a workpiece where the hole depths are critical. Another example is where multiple through-holes are being machined, and it is important that all electrodes break through at substantially the same time.

Advances in EDM control apparatus are demonstrated by assignee's control system identified by the designation CP-60. The CP-60 control system is a microprocessor-based control which greatly enhances the performance of EDM apparatus. That system represents an advance toward the ultimate objective of a completely adaptive control system. In an adaptive control system actual machining conditions, or indicators of actual machining conditions, are monitored while in progress, and the manner of control is concurrently adapted in respect of the monitored conditions or indicia thereof so that optimum machining action occurs. By way of example an adaptive control may on the one hand provide a more rapid machining procedure where the actual machining is easier than anticipated, and it may on the other hand provide a slower machining rate where the actual machining operation is more difficult than originally anticipated.

The present invention constitutes an improvement upon an EDM control system toward the ultimate objective of a completely adaptive control system. The present invention in this regard, is directed to an electronic depth controller which is employed in operative association with the main EDM control. The electronic depth controller of the present invention acts upon selected input data relating to advance of the machining electrodes, and hence depth of holes machined in the workpiece, and interacts with the main control system in a manner whereby difficult hole machining problems, such as those referred to above in connection with blind holes and simultaneous breakthrough of multiple holes, are solved. Accordingly the present invention is particularly adapted for enhancing the capability of EDM apparatus in accurately machining multiple blind holes to precision depths and also to accomplishing simultaneous breakthrough where multiple through-holes are being machined in a workpiece. The basic function of the electronic depth controller of the present invention will therefore be recognized as assuring precise depth location of the tips of the EDM electrodes. This can consequently eliminate opposite wall damage when machining into a cavity and eliminate scarfing. By virtue of the electronic character of the depth controller of the present invention, in conjunction with the electronic character of the main control system, virtually instantaneous response to actual machining condition occurs whereby depth control and simultaneous breakthrough are accomplished with precision.

Briefly, the preferred embodiment of depth controller comprises its own microprocessor which receives selectable input data from input selector switches which are mounted on a control panel. The microprocessor acts upon the data supplied by the selectable input switches and provides output data based upon the selectable input data which is conveyed to the microprocessor of the main control. The electronic depth controller thereby provides information relating to machining depths and the main control acts upon this information in controlling the machining process. The input data which is supplied by the control panel switches comprises an initial depth limit, a first desired machining increment, a second desired machining increment, and the number of desired machining increments. Furthermore, the control panel contains a selector switch for selecting a desired mode of operation of the depth controller.

The microprocessor of the depth controller is programmed with separate sets of operating instructions and the particular set of instructions which is executed is determined by the mode selector switch on the control panel. In a first mode of operation the microprocessor acts upon the selected initial depth limit, the selected desired first machining increment and the desired number of machining increments whereby the microprocessor of the electronic depth controller provides signals to the main microprocessor control whereby the electrodes are advanced in unison initially to the desired initial depth limit, and are thereafter advanced in a succession of machining increments with each machining increment corresponding to the setting of the desired first machining increment and the number of such machining increments being equal to the selected number of machining increments. In the second mode of operation the microprocessor of the electronic depth controller acts upon the selected initial depth limit, the second desired machining increment, and the desired number of machining increments to provide signals to the microprocessor of the main control system whereby the main control system is effective to cause the electrodes initially to advance simultaneously in unison to the desired initial depth limit and thereafter repeatedly advance in successive machining increments each of which is equal to the setting of the second desired machining increment and the number of which is equal to the selected desired number of machining increments.

Breakthrough sensing means are also provided and are utilized in conjunction with both modes of operation. In the first mode of operation the breakthrough sensing means causes a fault indication to be given if breakthrough is detected anytime before completion of the full machining sequence consisting of the initial advance to the desired initial depth limit and completion of the full number of desired first machining increments. Accordingly, it may be perceived that the first mode of operation is preferably utilized for the purpose of machining blind holes and hence a fault signal would be given if one or more of the holes had broken through.

The breakthrough sensing is utilized in conjunction with the second mode of operation for dual purposes. One purpose is to sense the intended breakthrough, meaning that all machined holes have broken through at the same time and that the cycle is therefore being completed. In this regard the breakthrough signal is utilized to arrest the machining cycle in such a way that only one additional desired second machining increment is allowed to occur subsequent to the machining increment during which breakthrough was sensed, even though the desired number of machining increments had not reached the full number which had been set on the control panel. This allows the operator the opportunity to check the workpiece to make sure that all holes have in fact been machined, even though the actual number of machining increments is less than the selected number set on the control panel. The second part of the dual purpose aspect of breakthrough sensing insofar as the second mode of operation is concerned is in conjunction with a fault indication. In this regard if breakthrough is sensed during advance of the electrodes to the initial depth limit, then a fault indication is given. Such a fault indication is desired because it is typically preferred that breakthrough occur during the progress of one of the desired second machining increments rather than during the initial advance of the electrodes to the initial depth limit. Accordingly, it can be perceived that the second mode of operation is intended to be selected where simultaneous breakthrough of multiple holes is desired.

A further aspect of the precision electronic depth controller involves a refeeding of the electrodes on the electrode holder at the conclusion of the arrival of the electrodes at the desired initial depth limit as well as a refeeding at the conclusion of each successive machining increment. The refeeding of the electrodes is for the purpose of maintaining a predetermined relationship between the tips of all the electrodes. One of the problems involved in multiple electrode machining is the possibility of uneven tip wear. Where multiple blind holes or multiple through-holes are being machined by a multitude of electrodes on a common holder, it is necessary for the electrode tips to be maintained in predetermined relationship so that the desired relationship between the respective depths of the blind holes in the first case, and the simultaneous breakthrough of the through-holes in the second case, always are obtained. Hence the electronic depth controller of the present invention provides for electrode refeeding, or redressing, to occur at the end of the initial advance to the desired initial depth limit as well at the end of each succeeding machining increment. The refeeding is accomplished by entirely conventional procedures which need not be described herein in detail. Preferably the electrodes are retracted from the workpiece to a location where the actual refeeding is accomplished.

A further advantage of the present invention is that the electronic depth controller is a unit which can be conveniently operatively associated with conventional EDM apparatus. Furthermore it possesses the capability for providing depth control of multiple EDM stations, although the present detailed disclosure of the preferred embodiment which hereinafter follows describes simply the operative association with a single EDM station.

The electronic depth controller of the present invention has the selectable input devices mounted on a common control panel and this control panel is particularly convenient for the machine operator and is conducive to having the operator quickly and accurately set depth parameters. The invention contemplates that a basic setting for a workpiece will be determined and set on the control panel switches. The operator may observe the work in progress and if a fault occurs adjustment in settings can be made as required. Once a machining cycle has been completed, the operator can observe the workpiece and determine if additional machining is required. If such turns out to be the case the depth parameters may be conveniently and quickly reset by the operator so that the job can be expediently and efficiently completed. Hence, where there are variations from workpiece to workpiece, such as in dimension, hardness, etc. the invention is particularly well suited for rapidly processing workpieces which have such differences. Accordingly, the invention in addition to improving the accuracy and precision of machining operations can increase the number of workpieces which can be processed.

It is also desirable for the control panel to contain a numerical readout display of the accumulated depth. This enables the operator to know the position of the electrode tips at all times during machining operations.

The foregoing features, advantages, and benefits of the invention, along with additional ones, will be seen in the ensuing description and claims which should be considered in conjunction with the accompanying drawings. The drawings disclose a preferred embodiment of the invention in accordance with the best mode contemplated at the present time in carrying out the invention.

DESCRIPTION OF THE PREFERRED EMBODIMENT

Figure 1:
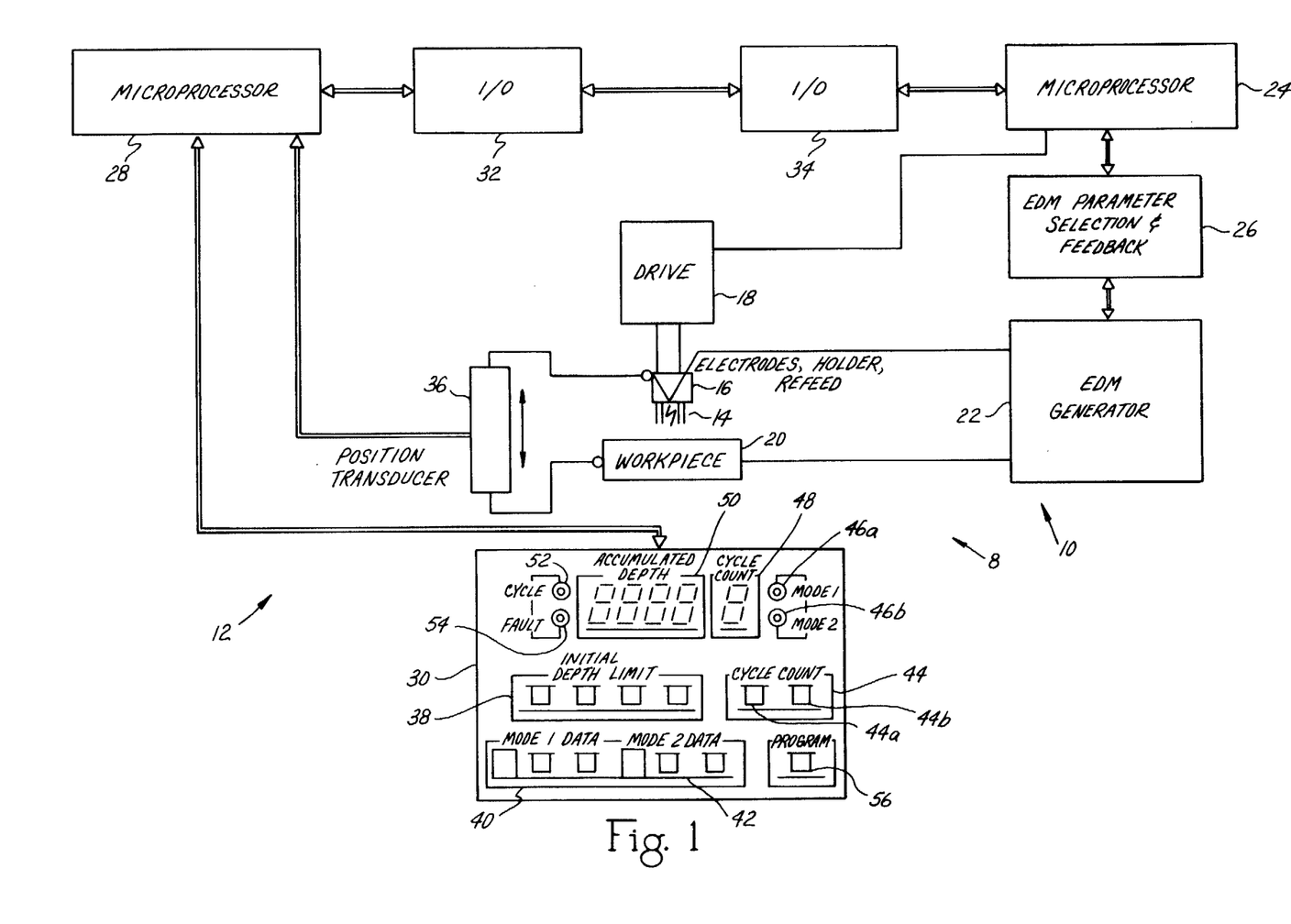
FIG. 1 is a schematic diagram of EDM apparatus including the electronic depth controller of the present invention.

FIG. 1 discloses in schematic form an EDM apparatus 8 including a main control system 10 with which the electronic depth controller 12 of the present invention is operatively associated.

The EDM apparatus 8 comprises a plurality of individual electrodes 14 mounted on a common holder 16. A servo drive 18 is operatively associated with the holder 16 to advance and retract the holder 16, and hence the electrodes 14, toward and away from a workpiece 20 which is to be machined by the apparatus. The holder also includes a conventional refeeding mechanism for refeeding the electrodes on the holder so as to maintain the electrode tips in a desired orientation.

The apparatus further includes an EDM generator 22 which is operatively associated with the electrodes 14 and the workpiece 20 to provide machining current. Control for the apparatus is provided by control 10 which is an electronic system including a microprocessor 24 as well as additional electronic circuit devices and components which are designated generally by the block 26 entitled "EDM Parameter Selection & Feedback". The control system is so integrated with the drive 18 and the EDM generator 22 that the holder 16 is positioned by the drive in accordance with command signals from the control to correspondingly position the electrodes 14 in relation to the workpiece 20. Hence the drive is operable to advance the electrodes 14 toward the workpiece and to maintain the electrodes in desired machining gap relation to the workpiece 20 while the EDM generator 22 supplies machining current across the gaps between the individual electrodes 14 and the workpiece so that the desired machining operations on the workpiece are conducted. The individual electrodes 14 are effective in this way to machine a multitude of holes in workpiece 20. Each hole may be of any desired cross sectional shape which will correspond to the shape of the electrode which is machining the hole. The actual machining operations are conducted in the vicinity of the tip of each electrode 14 with respect to the hole created thereby in the workpiece, and hence a working gap exists between each electrode tip and the workpiece across which electrical discharge machining current flows.

The circuit components designated by the general reference numeral 26 establish selected machining parameters for the operation of the EDM apparatus such as advance and retract speeds, machining current, and other standard parameters involved in EDM operations. This much of the apparatus which has just been described, with the exception of the electronic depth controller 12, constitute a previously known system such as the CP-60 system developed by assignee and referred to above.

The electronic depth controller 12 of the present invention is operatively associated with this previously known equipment and is shown in FIG. 1 to comprise its own microprocessor 28, and a control panel 30. The control panel 30 in general provides selectable input data to the microprocessor 28 related to the depth control of the electrodes tips 14 with respect to workpiece 20. Also there is provided an input-output (I/O) port 32 associated with microprocessor 28 and an input-output 34 associated with microprocessor 24 of the main EDM control system. This latter input-output port 34 may be an existing part of the system of the main microprocessor control or it may be an additional device which is added. The two input-output ports 32, 34 are in turn operatively associated whereby a bi-directional interface is provided between the two microprocessors 28, 24 for data signal transmissions.

Also associated with the electronic depth controller is a position transducer 36. The preferred form of position transducer 46 is a linear variable differential transformer (LVDT). The LVDT is operatively associated between the workpiece 20 and the holder 16 so that the effective output inductance of the LVDT is a function of the position of the holder 16, and hence the tips of the electrodes 14, in relation to workpiece 20. While the diagram schematically shows the transducer input coupled between the workpiece 20 and the holder 16 it will be appreciated that the position transducer might be mounted on the table on which the workpiece 20 is mounted and connected with some other point in the drive other than the holder 16. The primary consideration however is that the transducer provide an accurate measurement of the position of the electrode tips in relation to the workpiece 20. The output of the transducer is supplied as an input to the microprocessor 28 whereby a signal indicative of the electrode tips' position is supplied to the microprocessor 28. The exact manner in which this position information is subsequently used will become apparent from the ensuing description.

Attention is now directed to further detail of control panel 30. Mounted on the control panel are a number of selectable input devices. In the disclosed embodiment these input devices take the form of selectable thumbwheel switches each of which may be selectably set to one of the decimal digits 0-9. It will be appreciated however that other specific selectable input devices may be used if desired. One component of the input data which is selectable on control panel 30 and provided to microprocessor 28 is referred to as the Initial Depth Limit input and designated by the reference numeral 38. This initial depth limit input comprises four individual thumbwheel switches having increasing significance from left to right. The selectable input data which is provided by the setting of the switches constituting the initial depth limit 38 represents the amount of initial advance of holder 16 toward the workpiece.

Another input is identified by the nomenclature Mode 1 Data and identified by the reference numeral 40 while still another input is identified by the nomenclature Mode 2 Data and identified by the reference numeral 42. Each of the mode 1 and mode 2 inputs 40, 42 comprises two individual switches with one switch having a higher order of significance than the other. A further input is identified as the Cycle Count and referred to by the reference numeral 44. The cycle count comprises two individual switches 44a, 44b with the switch 44a being associated with the mode 1 data input and the switch 44b being associated with the mode 2 data input 42. Briefly, when the system is operating in mode 1 the electrodes, upon having been advanced to the initial depth limit set on 38, are successively advanced in machining increments corresponding to the mode 1 data set on switches 40 with the number of machining increments being determined by the setting of switch 44a. Correspondingly, when the mode 2 operation is selected, the electrodes, after having been advanced to the initial depth limit, are successively advanced in machining increments corresponding to the mode 2 data set on switches 42 with the number of increments being established by the setting of switch 44b. In other words, the cycle count refers to the number of machining increments.

It should also be pointed out that the settings of the switches 44a, 44b determine which operating mode or modes ensue. Normally one of the two switches will be set to the number zero and the other will be set to a non-zero number equal to the desired number of machining increments, and in such event it is the individual switch, either 44a or 44b, which has been set to the non-zero selection which determines which mode of operation ensues. For example with the mode 1 switch 44a set to zero and the mode 2 switch 44b set to five, the system will operate in mode 2 with five machining increments. Similarly, when the mode 2 switch 44b is set to zero and the mode 1 switch 44a to five, then the depth control will operate in mode 1 and execute five machining increments after the initial depth limit advance.

Also on control panel 30 are indicator lamps 46a, and 46b which are selectively illuminated in accordance with the particular mode or modes selected on the switches 44a, 44b. Hence when mode 1 is selected lamp 46a lights while when mode 2 is selected lamp 46b lights.

Also associated with the cycle count is a readout 48 comprising a single decimal digit readout which indicates the count of actual machining increments during operation. A four digit readout 50 is adjacent readout 48 and provides a display of the accumulated depth of the electrodes from the starting point of electrode advance. Two more indicator lamps 52 and 54 are mounted on panel 30. The lamp 52 is a cycle indicator lamp which lights when the electronic depth controller is in operation in one of the two modes. The other lamp 54 is a fault indicator lamp which is responsive to certain selected operating conditions hereinafter explained in detail to provide a fault indication. Thus it can be seen that the control panel 30 provides a convenient grouping for setting desired depth control parameters and an indication to operating personnel as to the status of machining operations involving the depth controller.

There is also associated with the control panel a switch 56 which selects the units of measurement of the data inputs 38, 40 and 42. This is also a thumbwheel type switch and may select the units in terms of distance or time. In the case of distance these may be in either English or Metric units.

The basic function of the electronic depth controller 12 is to subdivide an EDM cycle into a number of sub-cycles for the purpose of refeeding, or redressing the electrodes in order to achieve more precise and uniform hole depths and/or breakthroughs.

In connection with certain usage of the depth controller it is desirable to provide an indication of breakthrough. Such breakthrough occurs when one or more of the electrode tips 14 breaks through the workpiece which it is machining so as to create a through-hole. Hence at this point a brief description of how breakthrough is sensed is in order.

The preferred way to sense breakthrough is to monitor the basic machining rate through a workpiece and to monitor the average volocity during such machining. Breakthrough may be defined as a percentage in excess of 100 percent of the average machining rate. Hence when breakthrough of one or more of the electrode tips occurs there is a reduced resistance to advance whereby the main electronic control system causes the advance speed of the holder and hence of the electrodes to increase. Through appropriate selection of the percentage increase involved, a determination may be made whether or not breakthrough has occured. It should be pointed out that the particular number selected is subject to a range of tolerance and hence the actual number may vary from job-to-job. The calculation of breakthrough can be done electronically on either microprocessor.

Figure 2:
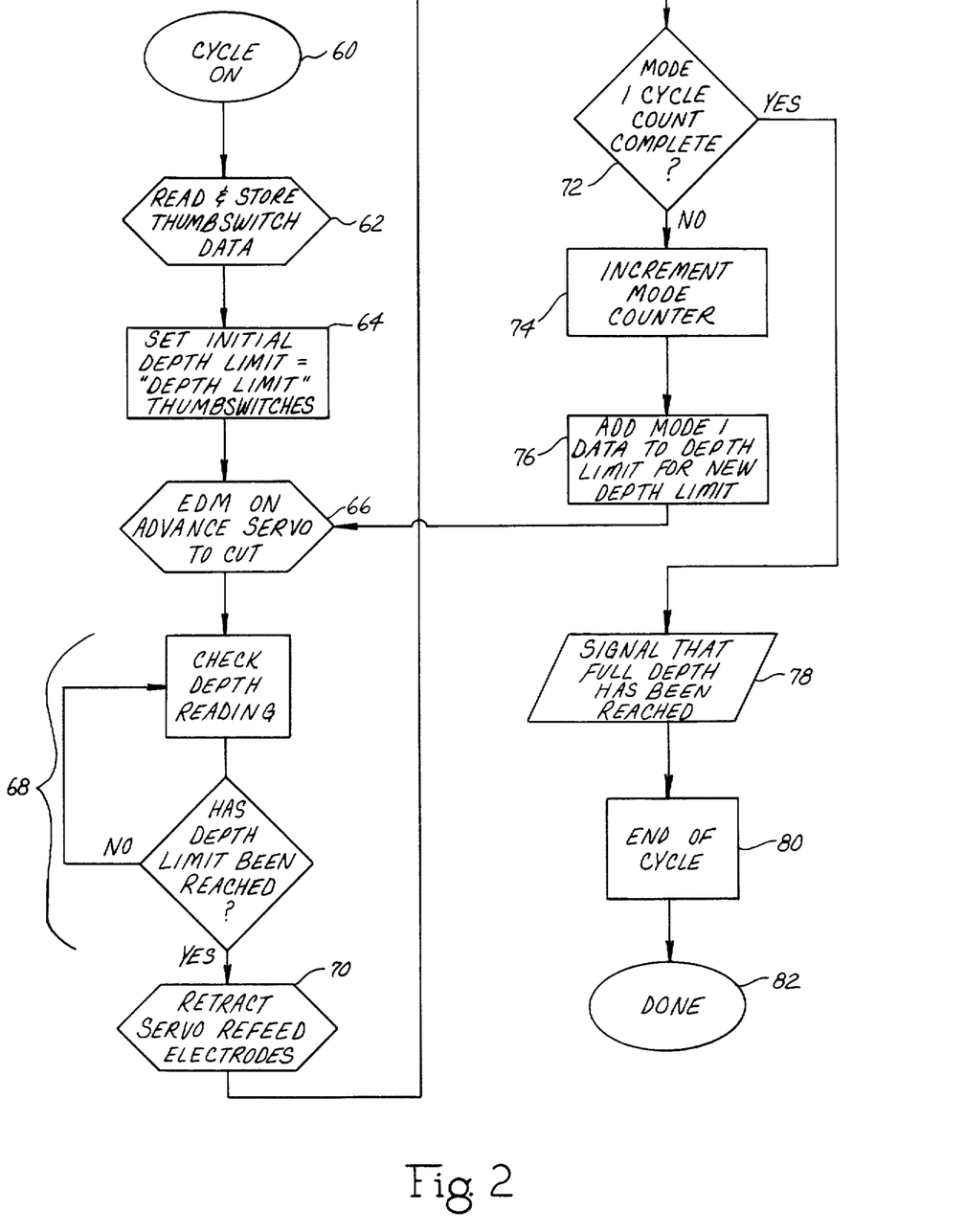
FIG. 2 is a schematic flow diagram of one mode of operation of the electronic depth controller of the present invention.

FIG. 1 having therefore been described, it is now appropriate to consider further details of the operation of the electronic depth controller 12 and for this purpose reference is made to FIG. 2. FIG. 2 illustrates a schematic flow diagram of the logic involved in the operation of the electronic depth controller in mode 1 operation. It should be pointed out that mode 1 operation typically is selected where blind holes, as opposed to through-holes, are to be machined in the workpiece.

Before considering the detailed operation it is well to consider the set up procedure for a workpiece since this will determine to a certain extent the setting of the selectable input switches. The workpiece is set up on a suitable holding fixture or table in the correct location where the electrodes can machine the desired holes. With the workpiece set up in this manner an approximate position of the final hole depth can be obtained. It is also possible to know the initial starting point of the electrode tips. With these two pieces of information, the total distance over which the electrode tips must be advanced during the complete machining cycle from the starting point to the final point of each hole is substantially known. Also known is the point at which the electrode tips start in relation to the surface of the workpiece in which the holes are to be machined, and this may or may not be the surface of the workpiece itself. Therefore with all this information the settings of the selectable input devices may be made, also taking into account machining characteristics of the particular EDM apparatus and the particular workpieces involved so that precision depth control is obtained.

During the course of machining the electrode tips may experience wear and this wear may be uneven from electrode to electrode. For example this will be the case where the surface of the workpiece is at an angle to the horizontal and where the electrode tips are disposed in a common horizontal plane. In other words, in such a situation certain of the electrode tips will begin machining their holes before others. Where there is uneven or heavy electrode wear along with a stringent requirement for exact depth or simultaneous breakthrough in a workpiece, a larger number of refeed cycles combined with short penetration distance, i.e. shorter machining increments, may be required to insure that the electrodes remain equal in length during the completion of the respective holes. Thus while for purposes of this patent application a complete machining cycle is considered as an initial advance followed by successive machining increments, it will be appreciated that in actual practice more than one such machining cycle may be actually required in order to complete machining operations in the intended fashion on a given workpiece.

In setting the inputs, the initial depth limit is set to some desired value less than the total travel distance from the starting point of the electrode tips to the final depth of holes. The primary consideration in obtaining precision hole depth will be the length of the machining increment and the number of such machining increments involved. Hence the setting of the depth limit is normally calculated after the machining increment and number of such increments have been chosen. However this does not have to be strictly followed in all instances.

Therefore with this background in mind, particular attention is directed to details of FIG. 2 which describes the flow diagram involved in the operation of the system in mode 1 operation. The flow diagram shown in FIG. 2 constitutes the logic sequence by which the microprocessor 28 is programmed. The detailed program can be developed from the flow diagram by a competent individual having knowledge of conventional microprocessor programming techniques and hence it is deemed unnecessary to include details of an example of a program in this present application. Furthermore the invention, in its generic aspect, does not involve particular details of a program, and it will therefore be recognized that the invention contemplates the use of any of a number of specific programs.

The initial conditions for the apparatus involve the tips of the electrodes being set to the starting position, or reference position. The cycle is initiated as indicated at 60 and the first operation which is performed subsequent to starting of the cycle is indicated by the reference numeral 62. This step involves the reading and storing of the setting of the initial depth limit on the initial depth limit switches 38 and the reading and storing of the data on switches 40. The next step indicated by the reference numeral 64 involves the loading of data corresponding to the selected initial depth setting into a register.

The next step 66 involves the microprocessor 28 supplying to the main control system, via the input and output ports 32 and 34 to the main control system, a signal which is acted upon by the main control system to turn on the EDM and advance the servo drive 18 over the initial advance toward the initial depth limit. When the electrode tips are in proximity for machining current to be conducted then the holes are machined. It is possible for machining to occur during all, during only part of, or during none of the initial advance toward the initial depth limit.

While the electrodes are advancing toward the initial depth limit setting, the microprocessor 28 monitors the advance of the electrodes. This is done by the signal from position transducer 36 being converted into a position data signal which the microprocessor compares with the contents of the register containing the initial depth limit data. This comparison step is indicated by the reference numeral 68 and occurs at a repetition rate which is much faster than the advance of the electrodes so that the position of the electrodes in this way is very frequently compared with the depth setting so that overshoot is avoided. It will be noted that there is a feedback loop in the depth monitoring steps whereby the actual depth is repeatedly monitored.

Once the depth limit has been reached, the microprocessor 28 provides a signal to microprocessor 24 indicated by the step 70. This signal is effective to cause the drive 18 to retract the holder and electrodes. Refeeding of the electrodes on the holder also occurs during this time. Such refeeding of the electrodes avoids unevenness in machining operations resulting from uneven tip wear, and hence the electrode tips are maintained in their desired relationship.

Once the initial advance to the initial depth limit has occured, the control causes further subcycles consisting of the individual machining increments. Before a machining increment can commence, a determination must be made. This involves a comparison step, performed as indicated by the reference numeral 72 which compares the actual cycle count with the cycle count set on switch 44a. At the beginning of the cycle, the actual count was reset to zero and hence a zero is displayed on the cycle count display 48 during the initial advance to the initial depth limit. Before the first machining increment subcycle is initiated the comparison operation between the actual cycle count and the selected cycle count on switch 44a is made. Presuming that equality is not detected, the cycle count is incremented by one count as indicated by step 74. This in turn initiates an updating 76 of the initial depth limit data previously loaded in the register. In other words a value corresponding to the selected mode 1 machining increment data on selector switches 40 is added to the contents of the register to provide an updated depth limit equal to the initial depth setting plus one machining increment. A signal is given to microprocessor 24 which in turn provides a signal to drive 18 causing the electrode tips to advance toward the workpiece so as to execute the first machining increment. Machining operations continue with the depth being checked in the checking loop 68. This procedure (i.e. 68, 70, 72, 74, 76) is repeated until such a time as the comparison operation 72 detects equality between the actual number of cycles and the setting of switch 44a. When that equality is detected, a signal is given (78) indicating that the full depth has been reached and this constitutes the end of the cycle (80) and in most instances this will means that the job has been completed (82). However as mentioned above, it is possible that a further cycle or cycles (at the same or different settings) might have to be executed depending upon the nature of the individual job. During the time that the machining operations are being conducted the accumulated depth readout 50 displays an indication of the instantaneous position of the electrode tips 14. This is provided through the information developed from position transducer 36 so that at all times the position of the electrodes tips is displayed to the operator. Also during this time the mode 1 lamp 46a is illuminated and during the machining cycle the lamp 52 is also illuminated.

Because the mode 1 operation is normally selected where a number of blind holes are being simultaneously machined, no breakthrough would be expected. The occurence of breakthrough would therefore indicate a problem. The controller functions to illuminate the fault light if a breakthrough is sensed anytime during the conduct of machining operations while the mode 1 operation is in progress.

The foregoing therefore describes the operation of the depth controller of the present invention in what has been referred to as the mode 1 operation. The mode 2 operation is now explained with reference to FIG. 3.

Figure 3:
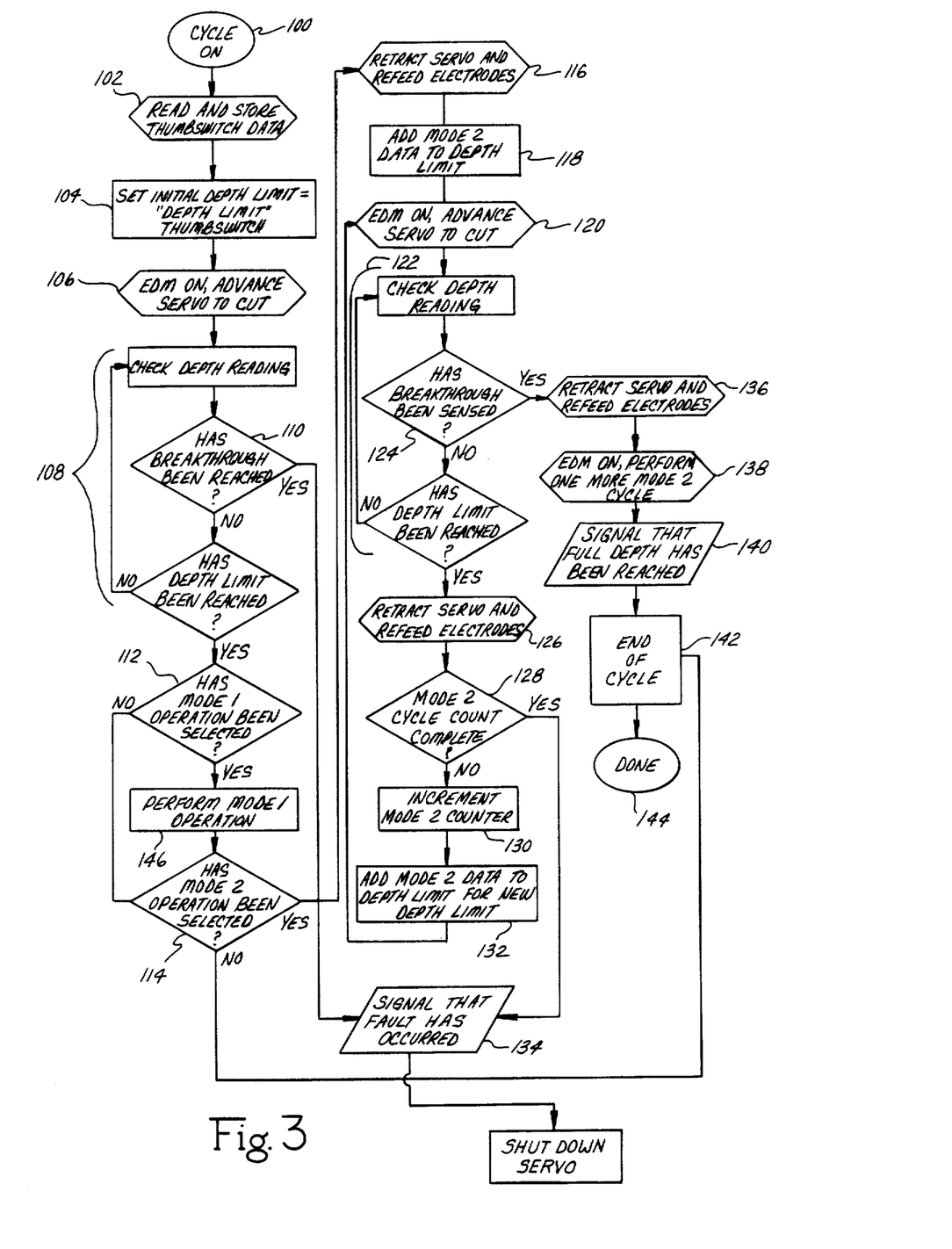
FIG. 3 is a schematic flow diagram of another mode of operation of the electronic depth controller of the present invention.

FIG. 3 illustrates the possible use of both mode 1 and mode 2 operations in conjunction with each other; however it does not disclose the details of the mode 1 operation. Hence it will be understood that one of the blocks shown in FIG. 3 represents the mode 1 cycle of operation which is described in FIG. 2.

The mode 2 operation is similar to the mode 1 operation in many respects. Mode 2 is used normally for precision breakthrough of through-holes. The starting point involves the electrode tips being set to the starting position, and the cycle being started (100). The data as to the initial depth limit on selector switches 38 and the increment on switches 42 is read and stored (102) by microprocessor 28. The register is loaded with data corresponding to this selected initial depth limit (104), and the microprocessor 28 provides a signal to microprocessor 24 via the interfacing circuitry causing the EDM generator to become active and the main control system to advance the electrodes toward the workpiece so as to perform the machining operations (106). During this time the depth of penetration (i.e., the advance of the electrode tips) is being monitored in the loop indicated by the reference numeral 108. This depth checking is similar to the depth checking in the mode 1 operation; however it includes a further determination involving the question as to whether breakthrough has been detected (110).

Assuming that breakthrough has not been detected then the loop 108 operates in exactly the same manner as the corresponding loop 68 in FIG. 2.

Immediately downstream of loop 108 is the determination (112) as to whether mode 1 operation has also been selected. Assuming that mode 1 operation has not been selected, (usually the case) then as soon as the depth limit has been reached, consideration is given as to whether mode 2 operation has been selected (114). Assuming such to be the case, then the main control is signalled and servo is retracted (116). Once again the determinations are made virtually instantaneously so that upon the initial depth limit being reached, there is no overshoot. The electrodes are refed on the holder at this time. This completes the initial advance of the electrodes, and the machining cycle can now enter the subcycles wherein the individual machining increments are conducted.

For this purpose the mode 2 data as set on switches 42 is read and converted into data which is added (118) to the register containing the initial depth limit data thereby updating the depth limit to a new value which is equal to the initial depth limit plus the mode 2 data increment as set on switches 42. Upon this updating, the EDM is on and the drive 18 is advanced to continue the machining operations (120).

The control now goes through a checking routine 122 wherein the depth is checked to determine if the updated depth limit has been reached. This is analogous to the routine 108; it also includes a determination as to whether breakthrough has been sensed (124). Assuming that breakthrough has not been sensed then the machining operation continues until the updated depth limit is reached. When this happens the electrodes are retracted and refed (126) and a determination is made (128) as to whether the mode 2 cycle count has been completed. Assuming such is not the case, then the cycle count is incremented (130) and the data corresponding to the mode 2 data switch setting is added to the register to update the depth limit (132). The new cycle count is now displayed on the display 48, and control transfers back in the loop causing the EDM to be on (120) and the drive advanced to perform the second machining increment.

Assuming that breakthrough does not occur, then this procedure repeats until such time as the cycle count is complete. When that happens in the absence of any breakthrough having occured, then such is an indication of a fault (134) because normally a breakthrough should have occurred.

On the other hand should a breakthrough have been sensed during one of the machining increments, then control transfers immediately to retract the electrodes and refeed the electrodes on the holder (136). One final machining increment is now conducted (138), and upon completion of that final machining increment a signal (140) is given that the full depth has been reached and this constitutes the end of the cycle (142) and an indication that the job has been completed (144). The one final complete machining increment after breakthrough sensing should ensure substantially simultaneous breakthrough of all holes without overshoot.

In connection with mode 2 during the initial advance toward the initial depth limit setting, a fault signal will be indicated if breakthrough (110) occurs during such an initial advance. When a fault is given, the main servo control is immediately shut down.

It will be perceived from consideration of FIG. 3 that it is possible to integrate a mode 1 operation (146) with the mode 2 operation and that will happen prior to the execution of the mode 2 operation. However, in most instances it is believed that only one mode or the other mode will be selected for a given job.

The foregoing description discloses an electronic depth controller for use in association with EDM apparatus. The disclosure is of a preferred embodiment both from a constructional as well as a functional standpoint. Principles of the invention, however, are not limited to the preferred embodiment disclosed herein. For example in the case of machining through-holes, the preferred embodiment has one more complete cycle upon detection of a breakthrough. It is not necessary that this be the course of action which is always taken. In other words the sensing of breakthrough simply creates a decisional point, at which a decision as to further specific operations is made. Other possibilities are that additional subcycles could be executed, a further predetermined machining increment other than that of the selected subcycle could be executed, or the machining operation could be stopped entirely. These possibilities are merely examples. Also while the preferred embodiment includes refeeding means, it is not essential that such refeeding means be included in all instances.

The foregoing description discloses an electronic depth controller for use in association with EDM apparatus. The invention provides an improved capability for precision depth control of machined holes with respect to both blind holes as well as through-holes. While a preferred embodiment has been disclosed, it will be appreciated that principles of the invention as set forth in the following claims are applicable to other embodiments.

What is claimed is:

1. In EDM apparatus for machining at least one hole in a workpiece via at least one electrode mounted on a holder, said EDM apparatus comprising means for advancing and retracting said holder and at least one electrode in unison toward and away from the workpiece, means for refeeding the at least one electrode on the holder, a main control system for controlling the advance and retraction of said holder and at least one electrode relative to the workpiece and for controlling machining operations, and a depth control system operatively associated with said main control system, said depth control system comprising sensor means providing a signal referenced to a reference datum and indicative of relative position of the holder to the workpiece in the direction of advancement and retraction, the improvement in said depth control system which comprises input means for presetting an initial amount of travel for said holder in the direction of advancement at the beginning of a machining operation, said input means including means for presetting an increment of travel for said holder in the direction of advancement subsequent to the initial amount of travel in the direction of advancement, a data register for depth limit data, means for comparing the data contents of said data register with said sensor means signal, and operating means comprising means for loading said data register with the initial amount of travel preset by said input means and for causing the holder to advance said initial amount of travel at the beginning of a machining operation, means operable upon completion of said initial amount of advance to execute a sub-cycle, said last-named means comprising means for causing a refeeding of the at least one electrode, means for updating the data contents of said data register by the increment of travel set by said input means and for thereafter causing the holder and the refed at least one electrode to advance to the updated depth limit, and means for causing said sub-cycle to be repeatedly executed a given number of times.

2. The improvement set forth in claim 1, said input means further including means for presetting a number of said increments of travel and wherein said operating means comprises means for causing the total number of times said sub-cycle is executed to correspond to the number preset by said means for presetting a number of said increments of travel.

3. The improvement set forth in claim 1 including breakthrough sensing means for sensing breakthrough of one of said at least one electrodes through the workpiece, and means for causing the holder to repeatedly execute said increments of travel until breakthrough is sensed by said breakthrough sensing means.

4. The improvement set forth in claim 3 in which said operating means comprises means for causing one further update of the data contents of said data register and hence one further of said increments of travel to be executed after breakthrough is sensed by said breakthrough sensing means and for causing a refeeding of said at least one electrode before execution of said one further of said increments of travel.

5. The improvement set forth in claim 3 in which said breakthrough sensing means comprises means for sensing a predetermined acceleration in the travel of said holder which occurs in response to breakthrough.

6. The improvement set forth in claim 3, said input means further including means for presetting a number of said increments of travel, and said operating means comprising means for causing the total number of times said sub-cycle is executed to correspond to the number preset by said means for presetting a number of said increments of travel and for terminating machining operation if breakthrough has not been sensed by the time that such total number of sub-cycles has been executed.

7. The improvement set forth in claim 1 including breakthrough sensing means for sensing breakthrough of one of said at least one electrodes through the workpiece, and means providing a fault indication in response to sensing of breakthrough by said breakthrough sensing means during said initial amount of travel of said holder in the direction of advancement.

8. The improvement set forth in claim 1 wherein said depth control system comprises a microprocessor control containing two sets of operating instructions constituting two different operating modes and said input means further includes means for presetting another increment of travel for said holder in the direction of advancement subsequent to the initial amount of travel in the direction of advancement, said means for presetting an increment of travel for said holder in the direction of advancement subsequent to the initial amount of travel in the direction of advancement being associated with a first set of operating instructions, and said means for presetting another increment of travel for said holder in the direction of advancement subsequent to the initial amount of travel in the direction of advancement being associated with a second set of operating instructions, and selectable means for selecting which of said sets of instructions is to be executed, said first set of instructions acting upon said means for presetting an increment of travel and said second set of instructions acting upon said means for presetting another increment of travel, said microprocessor initially acting upon said initial amount of preset travel regardless of which set of operating instructions is selected.

9. The improvement set forth in claim 8, said input means further including means for presetting a number of said first-mentioned increments of travel and means for presetting a number of said another increment of travel, said means for presetting a number of said first-mentioned increments of travel being associated with said first set of operating instructions and said means for presetting a number of said another increments of travel being associated with said second set of operating instructions, said operating means comprising means for causing the total number of times said sub-cycle is executed, when said first set of instructions is selected, to correspond to the number set by said means for presetting a number of said first-mentioned increments of travel, and means for causing the total number of times said sub-cycle is executed, when said second set of instructions is selected, to correspond to the number set by said means for presetting a number of said another increment of travel.

10. The improvement set forth in claim 9 including breakthrough sensing means for sensing breakthrough of one of said at least one electrodes through the workpiece, said microprocessor control being operatively related with said breakthrough sensing means such that if breakthrough is sensed during said initial amount of travel of said holder, a fault signal is given, and such that if breakthrough is not sensed during execution of said second set of instructions, when said second set of instructions is selected, a fault indication is given at the conclusion of the holder having executed the preset number of said another increment of travel.

11. The improvement set forth in claim 10 in which said breakthrough sensing means comprises means for sensing change in the velocity of travel of said head and for providing said breakthrough signal in relation to a predetermined change in velocity of said head.

12. The improvement set forth in claim 9 in which said input means comprises plural input devices on a control panel, each device being assigned to provide a particular one of the preset inputs.

13. The improvement set forth in claim 12 including a visible readout display on said control panel providing a visible indication of the actual position of advancement of said holder.

14. The improvement set forth in claim 12 in which said input means are set in terms of either time or distance, or a derivative or derivatives thereof, such as velocity or acceleration.

15. The improvement set forth in claim 2, said input means further including means for presetting a further increment of travel for said holder in the direction of advancement subsequent to the initial amount of travel in the direction of advancement, and selectable means for selectively associating one of said means for presetting an increment of travel and said means for presetting a further increment of travel to the exclusion of the other for execution by said operating means.

16. In EDM apparatus for machining at least one hole in a workpiece via at least one electrode mounted on a holder, said EDM apparatus comprising means for advancing and retracting said holder and at least one electrode in unison toward and away form the workpiece, means for refeeding the at least one electrode on the holder, a main control system for controlling the advance and retraction of said holder and at least one electrode relative to the workpiece and for controlling machining operations, and a depth control system operatively associated with said main control system, said depth control system comprising sensor means providing a signal referenced to a reference datum and indicative of relative position of the holder to the workpiece in the direction of advancement and retraction, the improvement in said depth control system which comprises input means for presetting both an initial amount of travel to be traversed by said holder in the direction of advancement at the beginning of a machining operation and another increment of travel to be traversed by said holder in the direction of advancement subsequent to its traverse of the initial amount of travel in the direction of advancement, a data register for depth data, means for comparing the data contents of said data register with said sensor means signal, and operating means for depth control of a machining cycle including means operable at the beginning of a cycle for loading said data register with the initial amount of travel preset by said input means and for causing the holder to advance said initial amount of travel, and means operable during the conclusion of a cycle for causing the execution of one or more sub-cycles comprising a refeeding of the at least one electrode, an updating of the data contents of said data register by said another increment of travel, and an advancement of the holder and the refed at least one electrode to the updated depth.

17. The improvement set forth in claim 16 wherein said input means comprises an input device devoted exclusively to presetting said initial amount of travel and a second input device devoted exclusively to presetting said another increment of travel.

18. The improvement set forth in claim 17 in which said input means further includes a third input device devoted exclusively to presetting the number of sub-cycles to be executed during a cycle.

* * * * *